United States Patent [19]

Buckley

[11] 4,007,255
[45] Feb. 8, 1977

[54] PREPARATION OF RED AMORPHOUS SELENIUM

[75] Inventor: David A. Buckley, Rochester, N.Y.

[73] Assignee: Xerox Corporation, Stamford, Conn.

[22] Filed: Jan. 16, 1976

[21] Appl. No.: 649,959

Related U.S. Application Data

[63] Continuation-in-part of Ser. No. 495,242, Aug. 6, 1974, Pat. No. 3,954,951.

[52] U.S. Cl. .............................. 423/510; 423/508; 96/1.5
[51] Int. Cl.$^2$ ......................................... C01B 19/00
[58] Field of Search .................... 423/508, 509, 510

[56] References Cited
UNITED STATES PATENTS

| | | | |
|---|---|---|---|
| 2,111,112 | 3/1938 | Dudley | 423/510 |
| 3,110,685 | 11/1963 | Offergeld | 423/508 X |

OTHER PUBLICATIONS

Journ. of The Chem. Society, 1904, vol. LXXXVI, part II, p. 83.
Journ. of Physical Chem., vol. 4, 1900, p. 463.
"Selenium" pamphlet, 1908, paper read by Dr. Fred Klein, pp. 9 and 19.
J. Inorg. Nucl. Chem., 1960, vol. 13, pp. 58 and 59, Pergamon Press Ltd., Printed in No. Ireland.

*Primary Examiner*—Edward Stern

[57] ABSTRACT

Red amorphous selenium is obtained by precipitating selenium from a solution of selenious acid in methanol or ethanol with hydrazine or a soluble salt thereof at a temperature between about −20° C. and the freezing point of the solution. Further, the stable red amorphous may contain thallium which may then contain a halogen.

4 Claims, No Drawings

PREPARATION OF RED AMORPHOUS SELENIUM

This application is a continuation-in-part of copending application Ser. No. 495,242, filed Aug. 6, 1974, now U.S. Pat. No. 3,954,951, issued May 4, 1976.

This invention relates generally to a method for making red amorphous selenium and, more particularly, to a novel and improved method of reducing selenious acid to produce red amorphous selenium of small particle size. This invention further relates to stable red amorphous selenium containing thallium. This invention further relates to the stable red amorphous containing thallium which further contains a halogen.

It has been proposed before to precipitate selenium by reducing selenious acid in an aqueous solution with sulfur dioxide or sulfurous acid gas. Processes of this type are disclosed, for example, in British Pat. Specification 515,676 and in U.S. Pat. Nos. 1,730,681; 2,186,085 and 3,130,012. In addition, a process for precipitating selenium from an aqueous solution of selenious acid with sulfur dioxide, hydroxylamine, hydrochloride or hydrazine sulfate at 6° to 45° C. is described in U.S. Pat. No. 2,860,954. These prior art processes have the disadvantage that the precipitate may be crystalline or if it is amorphous when formed it is unstable and soon becomes at least partially crystalline. Moreover, the precipitate is often a mixture of red and black selenium or it is in relatively large lumps or granules which are undesirable for some coating processes.

It is, therefore, an object of this invention to provide a process for making red amorphous metallic selenium which can be used to advantage for coating photoreceptors, rectifier cells and the like.

Another object of the invention is to provide a process for making red amorphous selenium containing thallium which may or may not contain a halogen and which is substantially free from black selenium and having a small particle size.

A more specific object of the invention is to provide a novel process for precipitating red amorphous selenium containing thallium from a solution of selenious acid and thallium dioxide in particles of not more than about 5 microns.

Another object of this invention is to provide a thallium doped stable red amorphous metallic selenium in order to improve electrical properties, e.g., decrease dark decay, of the selenium.

Another object of the invention is to provide a thallium containing stable red amorphous metallic selenium which contains a halogen in order to improve the electrical properties, e.g., increase sensitivity or photospeed of the selenium.

The foregoing objects and others are accomplished in accordance with this invention, generally speaking, by providing a process for precipitating stable red amorphous metallic selenium in particles of not more than about 5 microns wherein hydrazine is mixed with a solution containing selenious acid in methanol, ethanol or a mixture thereof at a temperature between about −20° C. and the freezing point of the solution and maintaining selenium between about −13° and −3° C. until the yellow-orange amorphous precipitate formed by the reduction of the selenious acid changes to red amorphous selenium. The suspension may then be filtered and the precipitate washed with methanol or ethanol and dried. The product is substantially completely amorphous as shown by X-ray analysis and has a particle size of not more than about 5 microns. Particles as small as about 0.2 microns can be prepared by the process but it is preferred that they be within the range of about 1 to about 5 microns because it is sometimes difficult to filter a suspension of particles of less than 1 micron. It has been found that both the low precipitation temperature and alcohol solvent are required to produce an amorphous red product of small particle size which is stable in the sense that it remains amorphous substantially indefinitely.

Either methanol or ethanol may be used as the solvent for selenious acid but best results have been obtained so far with methanol, so it is preferred. The solvent used to make the solution may be substantially anhydrous methanol or ethanol or it may contain up to about 50 percent by weight water with the remainder being methanol or ethanol. The precipitated red amorphous metallic selenium may be washed with methanol or ethanol or an aqueous solution within the foregoing concentration range.

The hydrazine may be added to the selenious acid solution in an aqueous solution thereof. It is preferred that the solution used for precipitation of metallic selenium contain from about 0.0001 percent to about 1 percent by weight selenious acid. The amount of hydrazine used should be at least stoichiometrically equivalent to the amount of selenious acid in the solution of an excess thereof.

The addition of thallium to the selenium of this invention improves the electrical properties of the stable red amorphous metallic selenium. More specifically, the thallium decreases the dark decay in a member made with stable red amorphous metallic selenium. Therefore, the effective range of thallium in the stable red amorphous metallic selenium layer is from about 10 to about 10,000 parts per million (ppm).

A process is disclosed for producing stable red amorphous selenium containing thallium in particles of less than about 5 microns comprises precipitating selenious acid containing from about 10 parts per million to about 10,000 parts per million of thallium dioxide with hydrazine from a solution thereof in methanol or ethanol containing not more than about 50 percent by weight water at a temperature between about −20° C. and the freezing point of the solution and maintaining the resulting precipitate at a temperature of about −13° C. to about −3° C. until it is red.

The xerographic properties of the thallium containing stable red amorphous metallic selenium may also be improved by the addition of at least one member of the halogen family in amounts up to about 10,000 parts per million (ppm). In general, the effective range of halogen additive is from about 10 to about 10,000 parts per million. The sensitivity or photospeed is increased with the increased amounts of halogen. Although the amount of 10 parts per million of halogen does not exhibit a substantial increase in sensitivity, a more desired sensitive value can be obtained with greater amounts, such as at least 100 parts per million of the halogen. Similarly, amounts as high as 10,000 parts per million (1%) are effective. The thallium containing stable red amorphous metallic selenium containing the halogen may comprise the entire insulating layer or be present as a thin outer layer of a base layer of pure selenium.

Chlorine is the preferred halogen adding additive, in that it can be conveniently added as chlorine gas admitted to an evacuating tube containing gram qualities of the thallium containing stable red amorphous metallic selenium. The remaining amount of the thallium containing selenium is added to the tube and cooled in dry ice-acetone mixtures prior to sealing under vacuum. The chlorine is now sufficiently blended with the thallium containing selenium and the mixture is ball milled in the usual fashion in order to get a proper mix and homogeneous mixture.

Iodine may be added to the red amorphous metallic selenium and/or thallium by adding vapors of iodine to the particles of red amorphous metallic selenium and/or thallium and then ball milling the mixture in order to insure a homogeneous mixture. Bromine may be added by the same procedure as the iodine.

In the following examples, all parts are by weight unless otherwise specified.

EXAMPLE I 100 grams of selenious acid and 10 milligrams of thallium dioxide are dissolved in about 2.5 liters of substantially anhydrous methanol which has been previously cooled to about −20° C. About 44 grams of a 64% aqueous solution of hydrazine is added to the solution while maintaining the solution at a temperature of about −20° C. A precipitate appears. The suspension is stirred for about 1 hour, filtered with a sintered glass filter and the precipitate is washed with methanol and dried at room temperature. The product is about 40 grams of thallium doped stable red amorphous metallic selenium having a particle size of about 1 to about 5 microns. The product is removed, the selenium containing the thallium is made into a photoreceptor which exhibits excellent xerographic properties including improved dark decay.

EXAMPLE II 12 grams of the thallium containing stable red amorphous metallic selenium as formed in Example I is put into a closed container and subjected to 100 parts per million chlorine gas. Sufficient time is allowed for the reaction to go to completion. After the completion of the reaction, the material, i.e., chlorine doped thallium containing stable red amorphous metallic selenium, is placed in a ball mill and milled for 15 minutes. The product is removed, the thallium containing selenium containing the halogen is made into a photoreceptor which exhibits excellent xerographic properties including improved photospeed.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for producing stable red amorphous selenium containing thallium in particles of less than about 5 microns which comprises:
    a. adding a sufficient amount of selenious acid, and from about 10 parts per million to about 10,000 parts per million of thallium dioxide to methanol or ethanol containing not more than about 50 percent by weight water at a temperature between about −20° C. and the freezing point of the solution; and the solution containing hydrazine, the amount of hydrazine being at least stoichiometrically equivalent to the amount of selenious acid in the solution;
    b. then maintaining the solution between about −13° C. and −3° C. until the yellow-orange amorphous precipitate formed by the reduction of the selenious acid by the hydrazine changes to red amorphous selenium;
    c. then filtering the solution; and
    d. then washing the precipitate with methanol or ethanol and drying.

2. The process of claim 1 wherein stable red amorphous selenium containing thallium further contains from about 10 part per million to about 100,000 parts per million of a halogen.

3. The process of claim 2 wherein the halogen is selected from the group consisting of chlorine, bromine and iodine.

4. The process of claim 2 wherein the halogen is chlorine.

* * * * *